United States Patent [19]
Motoyama

[11] Patent Number: 6,039,012
[45] Date of Patent: Mar. 21, 2000

[54] OPERATING CONTROL SYSTEM FOR 2 CYCLE DIRECT INJECTION ENGINE

[75] Inventor: Yu Motoyama, Iwata, Japan

[73] Assignee: Yamaha Hatsudoki Kabushiki Kaisha, Japan

[21] Appl. No.: 08/932,230

[22] Filed: Sep. 17, 1997

[30] Foreign Application Priority Data

Sep. 18, 1996 [JP] Japan ..................... 8-246321
Sep. 18, 1996 [JP] Japan ..................... 8-246322

[51] Int. Cl.$^7$ ..................... F02B 75/02
[52] U.S. Cl. ............ 123/65 PE; 60/324; 440/89
[58] Field of Search ............ 123/65 PE; 60/324; 440/89

[56] References Cited

U.S. PATENT DOCUMENTS

| | | | |
|---|---|---|---|
| 4,920,932 | 5/1990 | Schlunke | 123/65 PE |
| 5,063,888 | 11/1991 | Ozawa et al. | 123/65 PE |
| 5,190,006 | 3/1993 | Motoyama et al. | 123/65 PE |
| 5,709,177 | 1/1998 | Worth et al. | 123/65 PE |
| 5,782,214 | 7/1998 | Nanami et al. | 123/65 PE |
| 5,832,881 | 11/1998 | Karay et al. | 123/65 PE |

*Primary Examiner*—Noah P. Kamen
*Attorney, Agent, or Firm*—Knobbe, Martens, Olson & Bear, LLP

[57] ABSTRACT

An exhaust control system for a two-cycle, crankcase compression, direct injection engine wherein an exhaust control valve modifies the effective cross-sectional area of the exhaust system in response to engine speed and operator demand to provide optimum charging and scavenging conditions. The exhaust control system is modified in response to other than normal steady state operating conditions such as during starting, warm up, and during rapid changes in engine speed and/or load and/or operator demand so as to improve performance during these conditions.

16 Claims, 15 Drawing Sheets

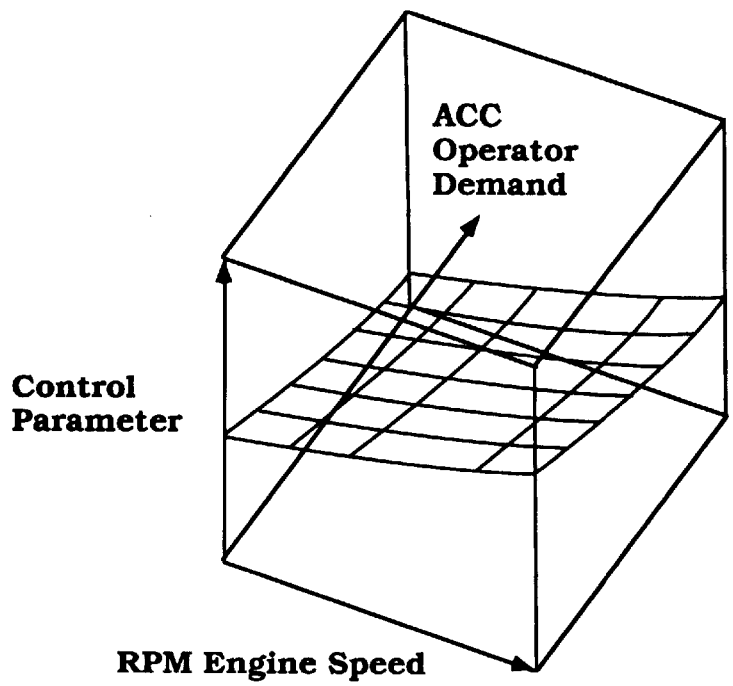
Figure 8
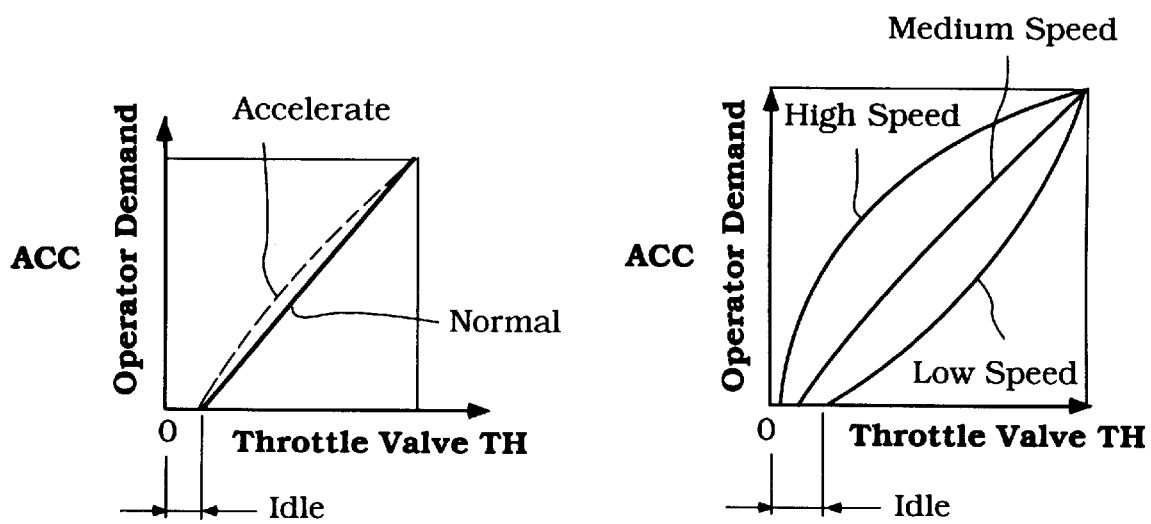
Figure 9  Figure 10

OPERATING CONTROL SYSTEM FOR 2 CYCLE DIRECT INJECTION ENGINE

BACKGROUND OF THE INVENTION

This invention relates to an internal combustion engine and more particularly to an improved operational control system for a two-cycle, direct cylinder injected, internal combustion engine.

As is well know, two-cycle internal combustion engines have a number of advantages. One of these advantages is that this type of engine provides a relatively high specific output in relation to its displacement. This is a result of the engine firing every crankshaft revolution, as opposed to every other crankshaft revolution, as with four-cycle engines.

Also, two-cycle engines generally are of the ported type, and hence, do not have the complicated valve trains and valve driving mechanisms associated with four-cycle engines. The fact that the scavenging cycle takes place at the same time as the exhaust cycle, however, gives rise to certain problems in connection with effective exhaust emission control.

In order to improve engine performance, it has been proposed to employ a direct cylinder injection system for two-cycle engines. With such a system, it is possible to obtain better control of the fuel-air ratio in the combustion chamber. However, the ported nature of the engine gives rise to the possibility that the direct spray of fuel into the combustion chamber may result in some of the fuel passing out of the exhaust port during running conditions, and particularly when large durations of fuel injection are required.

Also, it has been proposed to mount the fuel injector for a two-cycle engine in a location where it will be shielded by the piston during a portion of the combustion cycle. This protects the injector from contamination, and yet permits the use of lower cost fuel injectors than those that are exposed to the maximum combustion pressure and temperature. However, this shrouding of the fuel injector further restricts the time at which fuel can be injected, and thus gives rise to the aforenoted problems.

In accordance with an important feature of the invention, it is proposed to embody a system that employs an exhaust control valve which controls the effective cross-sectional area of the exhaust port, and can cooperate to reduce the likelihood of unburned fuel from passing out of the exhaust port. By controlling the position of the exhaust control valve in response to running conditions such as speed and/or load, exhaust emission control can be facilitated.

It is possible to provide a map that will show the correct exhaust control valve position under a wide variety of engine speed and loads, and thus permits the desired results to be achieved. However, there are some conditions where the position of the exhaust control valve cannot or should not be dictated by either or both of load and/or speed.

It is, therefore, a principal object of this invention to provide an improved operating control system for a two-cycle, direct injected engine.

It is a further object of this invention to provide an exhaust control system and method for operating it for such engines, which is responsive to a wide variety of engine running conditions so as to improve performance under all conditions.

Low speed and low load conditions are one condition when the control of the effective area of the exhaust passage can be significant. Under these conditions, there is a likelihood of irregular combustion due to the low speed. That is, at low speed operation there is relatively sluggish movement of the scavenging gases in the combustion chamber. This coupled with the overlap in the porting can cause exhaust gases to flow back into the combustion chamber and decrease the effective fuel-air ratio. This also causes poor flame propagation. Thus, by restricting the exhaust flow area under this condition, it is then possible to improve combustion stability.

However, when the engine is accelerated rapidly from this condition, the closed position of the exhaust valve may cause sluggish flow out of the exhaust system and retard rapid acceleration. Furthermore, this can cause rise in temperature in the combustion chamber.

On the other hand, if the engine is decelerated rapidly, then also the discharge of exhaust gases may be restricted, and high temperatures and engine stall are possible.

It is, therefore, a still further object of this invention to provide an improved exhaust control system for a two-cycle, direct injected engine that improves the performance under sudden changes in engine speed, such as rapid acceleration or deceleration.

Another condition when the positioning of the exhaust control valve should not necessarily be dictated from engine speed and/or engine load is during starting and initial warm-up. Again, because of the poor scavenging that may result at low speeds and the likelihood that exhaust gases can enter the combustion chamber, idling and low speed operation can be improved by restricting the exhaust gas flow.

However, the basic same operating condition of the engine, i.e., low speed and low load, also occurs during cranking for starting. Restricting the exhaust control valve under this time can cause poor start-up performance. It is normally the practice to enrich the fuel amount when the engine is started, and this results in an overly rich mixture, since the intake air does not correspond to the increased amount of fuel.

It is, therefore, a still further object of this invention to provide an improved exhaust control arrangement for a two-cycle, direct injection engine, wherein start-up performance is facilitated.

In addition to the initial starting of the engine, it is also necessary to ensure that once the engine is started, it can warm up rapidly so that it will reach its operating temperature sooner and improve the efficiency of the engine. This also is a running condition when the position of the exhaust control valve should not be controlled only by engine load or speed.

It is, therefore, a still further object of this invention to provide an engine warm-up control arrangement for controlling the exhaust gas discharge of a two-cycle, direct injection-type of engine.

SUMMARY OF THE INVENTION

The features of this invention is adapted to be embodied in a two-cycle, direct injected internal combustion engine and method of operating such an engine. The engine is comprised of a cylinder block that forms at least one cylinder bore. One end of the cylinder bore is closed by a cylinder head, while the other end is closed by a crankcase member. A piston reciprocates in the cylinder bore and drives a crankshaft that is journaled within a crankcase chamber formed by the crankcase member, the cylinder block and the piston. A combustion chamber is formed by the piston, the cylinder bore and the cylinder head. A fuel injector is supported to spray fuel directly into the combustion chamber. An air charge is delivered to the combustion chamber through a scavenge port and a burnt charge is discharged from the combustion chamber through an exhaust port and exhaust system. An exhaust control valve is provided in the exhaust system for controlling the effective flow area. Means are provided for sensing at least one of engine speed and/or load condition and for controlling the position of the exhaust control valve in response to the sensed condition.

In accordance with an apparatus for performing the invention, means are also provided for determining the operating state of the engine and for modifying the position of the exhaust control valve relative to that dictated by the sensed condition in response to the sensing of a certain type of engine running condition.

A method for practicing the invention with an engine of the type described is comprised of determining the engine running condition and modifying the position of the exhaust control valve when a specific type of engine running condition is encountered.

BRIEF DESCRIPTION OF THE DRAWINGS

FIGS. 8–12 are graphical views showing the map arrangements utilized in connection with the normal control routine.

FIG. 8 is a three dimensional map that shows the control parameter relationship between operator demand engine speed and throttle valve opening.

FIG. 9 shows the relationship between operator demand and throttle opening during normal and acceleration operations, as indicated in the solid and broken lines, respectively.

FIG. 10 is a graphical view, in part similar to FIG. 9, and shows the relationship between operator demand and throttle valve position at a variety of speed ranges, specifically high, medium and low.

FIG. 11 is a three-dimensional map, in part similar to FIG. 10, showing the fuel injection timing in response to engine speed and load.

FIG. 12 is a graphical view showing the condition of the exhaust control valve relative to the operator demand or throttle valve position under a variety of speed conditions, again showing high, medium and low speeds.

DETAILED DESCRIPTION OF THE PREFERRED EMBODIMENTS OF THE INVENTION

Figure 1:
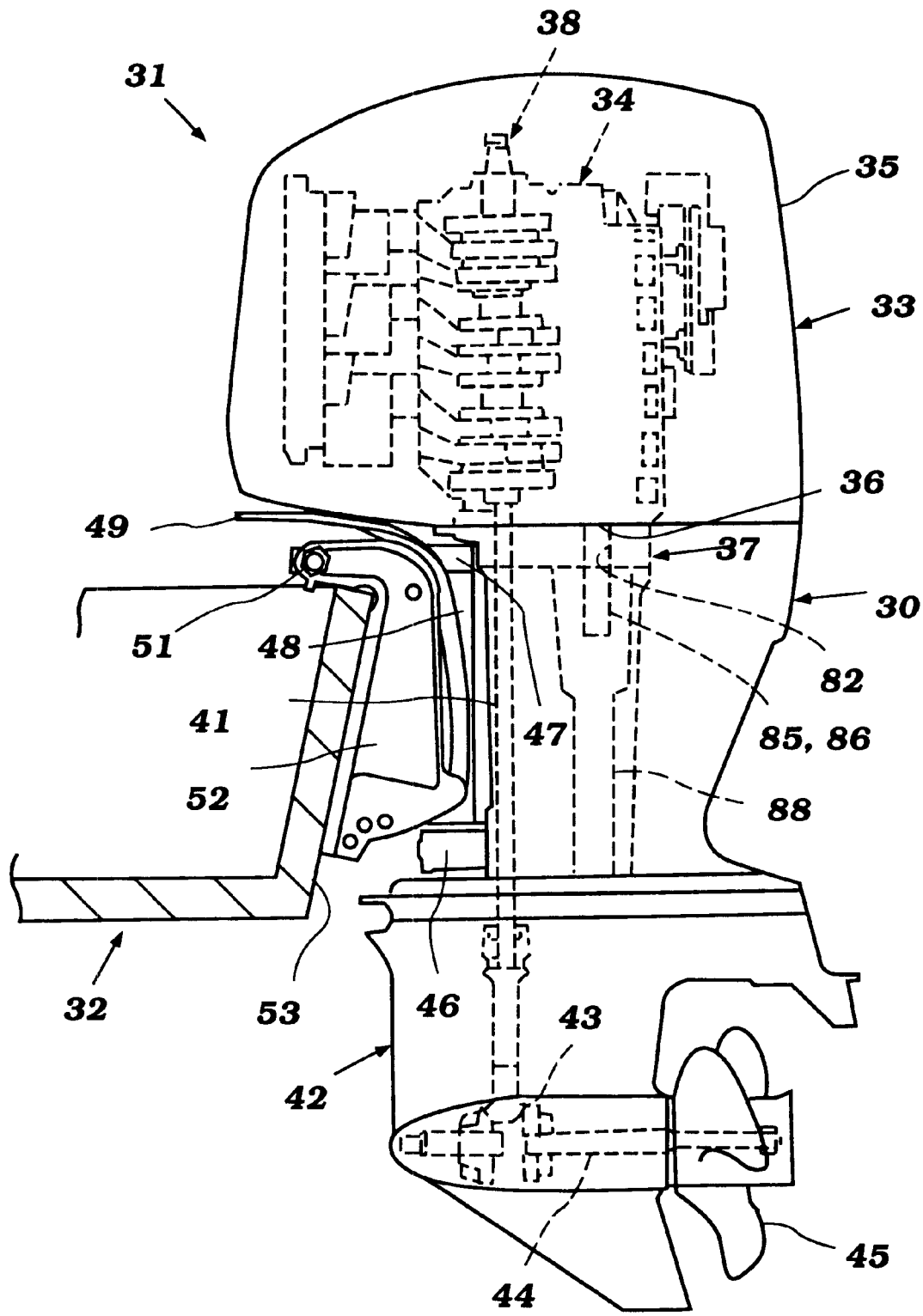
FIG. 1 is a side elevational view of an outboard motor constructed and operated in accordance with an embodiment of the invention, shown attached to the transom of an associated watercraft, which is shown partially and in section.

Referring now in detail to the drawings, and initially to the embodiment of FIG. 1, an outboard motor constructed and operated in accordance with an embodiment of the invention is identified generally by the reference numeral 31. The outboard motor 31 is shown as attached, in a manner to be described, to the transom of a watercraft, indicated generally by the reference numeral 32, and which is shown partially and in cross-section. The invention is described in conjunction with an outboard motor because the invention has particular utility with two-cycle engines, and those engines are frequently employed as the power plants in outboard motors. It will be readily apparent, however, to those skilled in the art how the invention can be utilized in conjunction with other applications for internal combustion engines and particularly two-cycle internal combustion engines.

The outboard motor 31 is comprised of a power head, indicated generally by the reference numeral 33, which includes an internal combustion engine, indicated generally by the reference numeral 34 and which will be described in more detail later by reference to FIGS. 2–6. This engine 34 is covered by a protective cowling that is comprised of a main cowling member 35 which is detachably affixed to a tray identified by the reference numeral 36.

The engine 34 is mounted on an exhaust guide 37 so that its crankshaft 38 rotates about a vertically extending axis. The exhaust guide 37 is disposed at the upper end of a drive shaft housing 39 in which a drive shaft 41 is journaled for rotation in a known manner. The crankshaft 38 is coupled to the drive shaft 41 for driving it in a well-known manner.

This drive shaft 41 depends into a lower unit 42 where it drives a bevel gear, forward, neutral reverse transmission 43. This transmission 43 establishes a driving connection in the desired direction to a propeller shaft 44. The propeller shaft 44 is journaled in a known manner in the lower unit 42, and drives a propeller 45 for propelling the associated watercraft 32.

A steering shaft (not shown) is affixed to the drive shaft housing 39 by means of a lower bracket 46 and an upper bracket 47. This steering shaft is journaled for rotational movement about a vertically extending axis within a swivel bracket 48. As is well known in the outboard motor art, this facilitates steering of the outboard motor 31 by means of a tiller 49 that is affixed to the upper end of the aforenoted steering shaft.

The swivel bracket 48 is, in turn, pivotally connected by means of a pivot pin 51 to a clamping bracket 52. Pivotal movement about the pivot pin 51 permits trim adjustment of the outboard motor 31 and also tilting up of the outboard motor 31 to an out-of-the-water position, as is also well known in this art.

Finally, the clamping bracket 52 includes means to permit detachable connection to a transom 53 of the hull of the watercraft 32.

The structure of the outboard motor 31 as thus far described may be considered to be conventional. As has been previously noted, the invention deals primarily with the engine 34 and the control and operational systems of the engine 34.

The construction of the engine 34 will now be described in more detail, referring primarily to FIGS. 2 and 3. In the illustrated embodiment, the engine 34 is depicted as being of the V-6 type. It will be readily apparent, however, to those skilled in the art how the invention may be practiced in conjunction with engines having other cylinder numbers and other cylinder configurations. Also, the engine 34 is a two-cycle, crankcase compression engine, inasmuch as the invention has particular utility with such engines. Again, however, certain facets of the invention may be utilized with engines other than two-cycle, crankcase compression engines.

The engine 34 is comprised of a cylinder block 54 that is formed with a pair of angularly inclined cylinder banks, each of which is formed with three cylinder bores 55. In the illustrated embodiment, the cylinder bores 55 are formed by liners that are pressed, cast or otherwise placed in the main cylinder block casting. The main casting is preferably formed from aluminum or an aluminum alloy.

Figure 2:
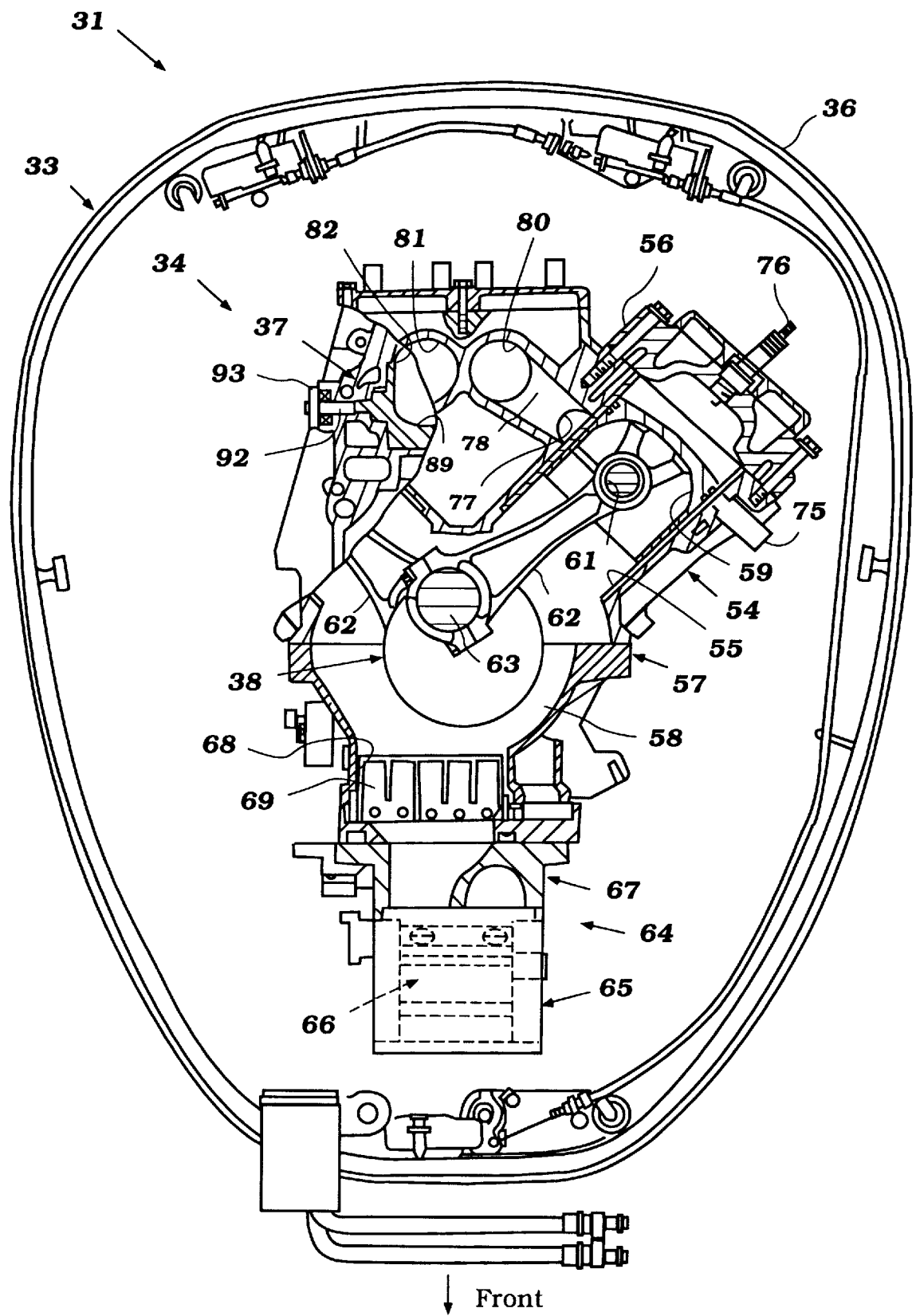
FIG. 2 is a top plan view of the power head of the outboard motor, with the protective cowling main portion removed, and portions of the engine broken away and shown in section.
Figure 3:
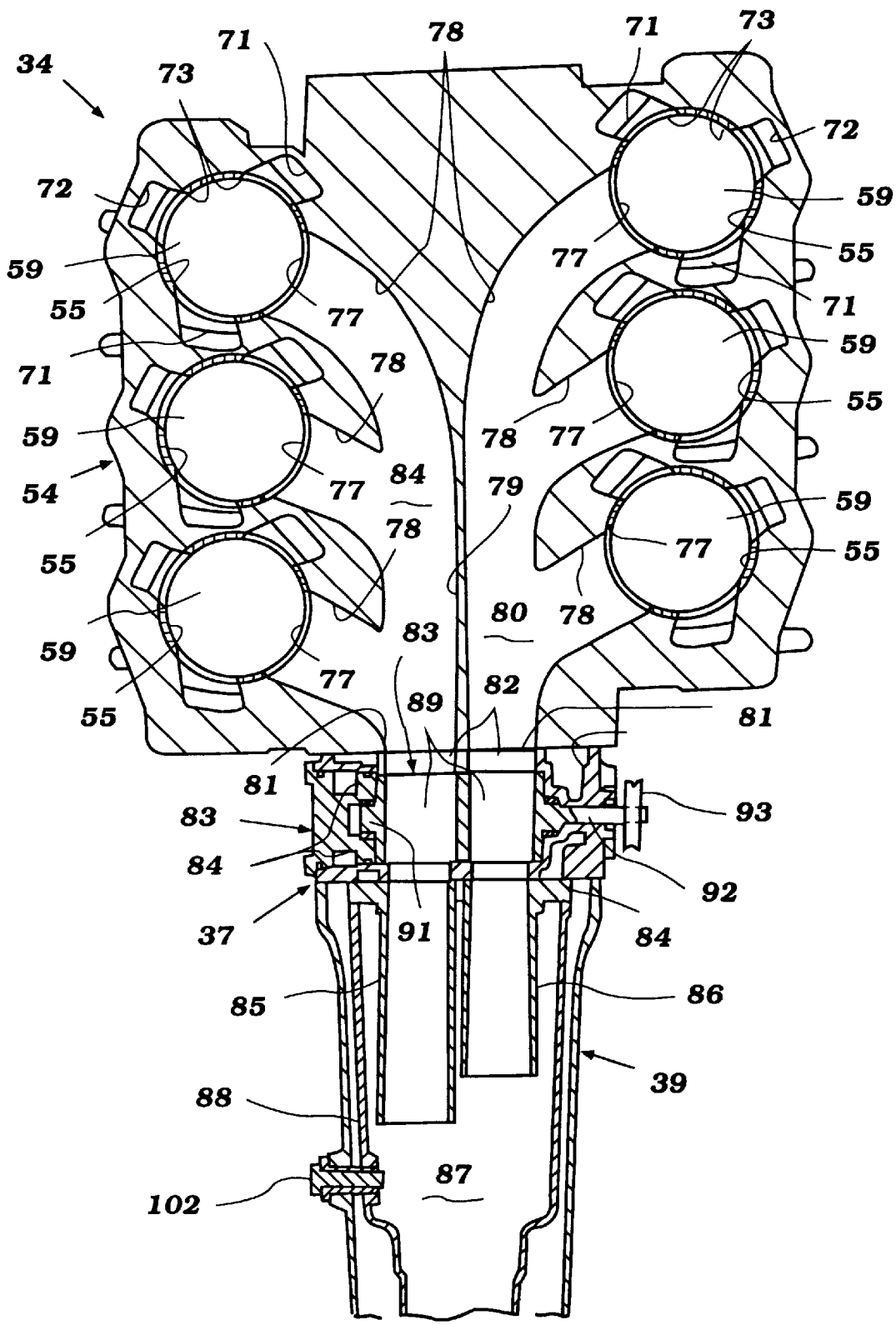
FIG. 3 is a further enlarged cross-sectional view, taken through the cylinder block, showing the upper portion of the exhaust system.

As may be seen in FIGS. 2 and 3, the cylinder bores 55 extend generally horizontally, and those of each bank are spaced vertically from the others. As also shown in FIG. 3, the cylinder bores 55 of the respective cylinder banks are staggered, one from the other, for reasons well known in this art.

One end of the cylinder bores 55 of each cylinder bank is closed by a respective cylinder head assembly 56 that is detachably connected to the respective cylinder block bank in any known manner. The other ends of the cylinder bores are closed by a common crankcase member 57 that is affixed to the skirt of the cylinder block 54. This crankcase member 57 and the cylinder block skirt form a crankcase chamber 58 in which the aforenoted crankshaft 38 is rotatably journaled in a known manner.

Pistons 59 reciprocate in their respective cylinder bores 55. Piston pins 61 pivotally connect the upper or small ends of connecting rods 62 to the pistons 59. The lower or big ends of the connecting rods 62 are journaled on the throws 63 of the crankshaft 38 for driving it in a well-known manner.

As is well known in the two-cycle engine art, the crankcase chamber 58 is divided into individual sealed chambers each associated with a respective one of the cylinder bores 55. An intake air charge is delivered to these crankcase chambers through an air induction system, indicated generally by the reference numeral 64. This air induction system includes an one or more air inlet devices 65 such as throttle bodies which may draw air through an air silencer (not shown) from within the protective cowling 35. Atmospheric air is admitted into the interior of the cowling through an inlet formed in the main cowling member 35. Again, this type of construction is well-known in the art and, for that reason, has not been illustrated.

Figure 7:
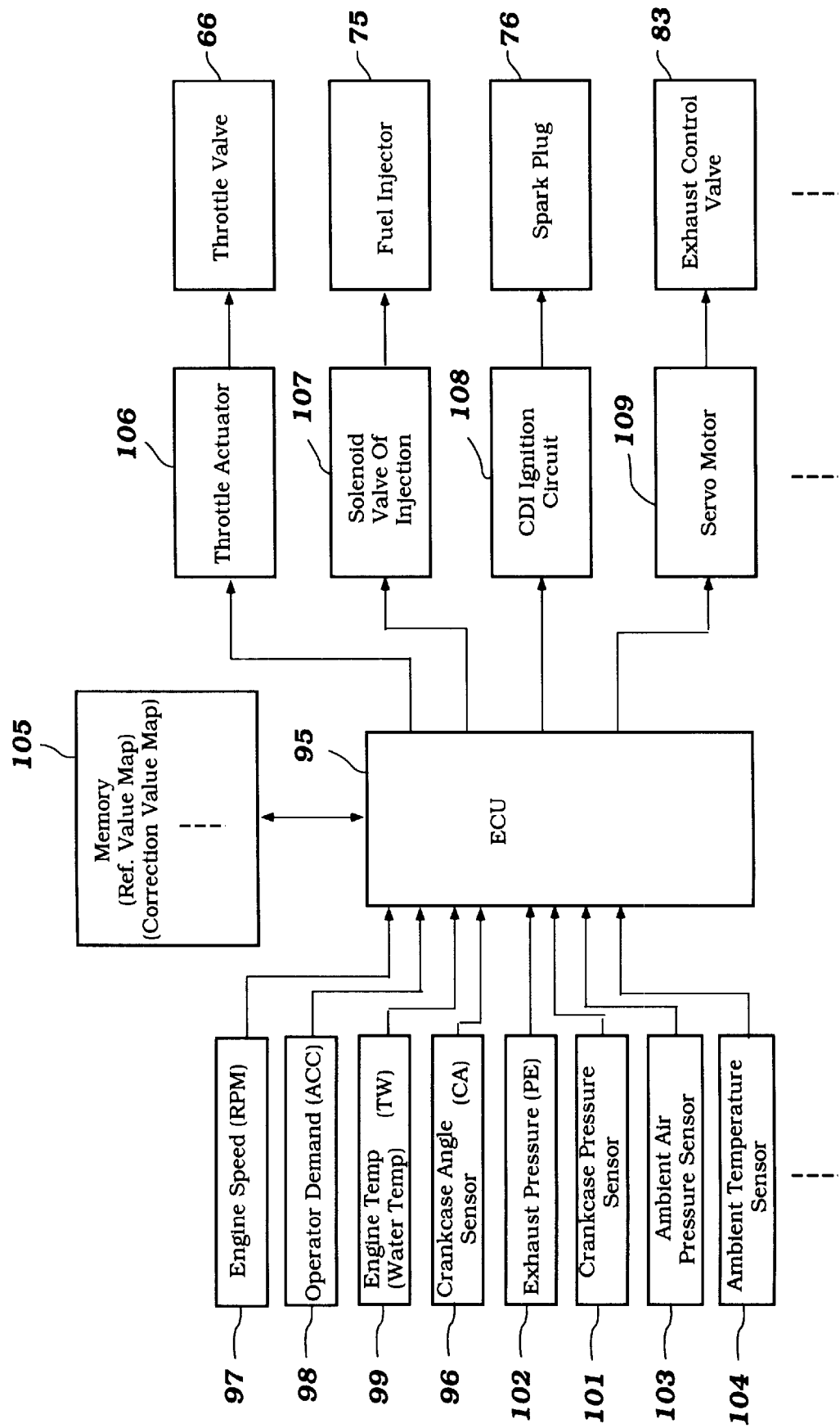
FIG. 7 is a partially schematic view, showing the control system and associated components.

Throttle valves 66 are provided in throttle bodies 65. These throttle valves 66 are controlled by a remote operator under operator demand in a manner which will be described. Although this will be described later, the particular system described is a so-called "fly-by-wire" system wherein the operator moves a manual accelerator control and that manual accelerator control position is sensed and the sensed information is sent to an ECU which does a final positioning of the throttle valve 66 in accordance with a control strategy which will be described later. This relationship between the components is also shown in FIG. 7 and will be described in more detail later by reference to that figure.

The throttle bodies 65 deliver their intake air charge to an intake manifold 67 that is sandwiched between them and the crankcase member 57. The passages of the intake manifold 67 feed the individual sealed crankcase chambers 58 through intake ports 68. A reed-type check valve assembly 69 is also sandwiched between the manifold 67 and crankcase member 57. As is well-known in this art, the reed-type valve assembly 69 permits air to flow into the crankcase chambers 58 when the pistons 59 are moving upwardly in their respective cylinder bores.

However, as the pistons 59 move downwardly to compress the air charge in the crankcase chambers 38, the reed-type check valve 69 will close and prevent reverse flow through the intake manifold 67. The charge which is compressed in the crankcase chambers 58 during the aforenoted motion is then transferred to the combustion chamber areas formed above the heads of the pistons 59. This transfer takes place through a pair of side scavenge passages 71 associated with each cylinder and a center scavenge passage 72. These scavenge passages 71 and 72 open into the cylinder bore through scavenge ports 73 formed in the cylinder liners which form the cylinder bores 55.

As may be seen in FIG. 3, these scavenge passages 71 and 72 are staggered slightly around the axes of the cylinder bores 55 so as to permit the cylinder bores 55 to be positioned closer to each other.

At a time after the piston 59 has moved downwardly to compress the charge in the crankcase chambers 58 associated with the respective cylinder, fuel will be injected into the combustion chambers, which are indicated generally by the reference numeral 74 and which are formed primarily by recesses in the cylinder head when the pistons 59 are at their top dead center position. For this purpose, a fuel injector, indicated by the reference numeral 75 is mounted in the cylinder block 54 in a location that is shielded by the piston 59 during the portion of its stroke adjacent top dead center condition, as shown in FIG. 2.

Fuel is supplied to the fuel injectors 75 by a fuel rail which is not shown. Fuel is delivered to this fuel rail by any suitable system that includes a high pressure pump and vapor separator. The pressure is controlled by dumping excess fuel back to the fuel supply system, preferably to the fuel vapor separator. The injection timing is controlled by an electrically solenoid-operated valve which is operated in the sequence and timing as will be described.

Thus, when the charge in the combustion chamber is fired and initial combustion occurs, in a manner which will be described, the fuel injector 75 is protected from the high heat and pressure. However, as the piston 59 continues to move downwardly, then the injector 75 will be exposed. The pressure and temperature will have fallen sufficiently so as to avoid any damage to the injector 75.

Fuel can be injected any time after the piston 59 moves downwardly to expose the injector 75 and terminate any time prior to the fact when the injector 75 is again shrouded by the piston. The fuel injection amount and duration routine is controlled by the control system which will be described shortly.

The fuel/air charge thus present in the combustion chamber when the piston 59 continues its upward movement will be further compressed in the combustion chamber once the scavenge ports 73 are closed.

As the piston 59 approaches its top dead center position and at a timing which is controlled, in a manner which will also be described later, a spark plug 76 mounted in the cylinder head assembly 56 will be fired. This firing is done by an ignition system which will also be described generally later.

As the pistons 59 are driven downwardly by the burning and expansion of the mixture which has been ignited by the firing of the spark plugs 76, eventually a series of exhaust ports 77, one for each cylinder bore 55 will be opened. These exhaust ports 77 are positioned in the cylinder liners and are generally diametrically opposed to the auxiliary scavenge passages 72 and the scavenge port 73 associated therewith.

The exhaust ports 77 communicate with respective exhaust runner passages 78 which form an exhaust manifold 80 that is integrally formed within the cylinder block 54. The exhaust manifolds 80 associated with each cylinder bank are separated from each other by an integral dividing wall 79 so that each cylinder bank is, in effect, provided with its own exhaust manifold 80.

Figure 4:
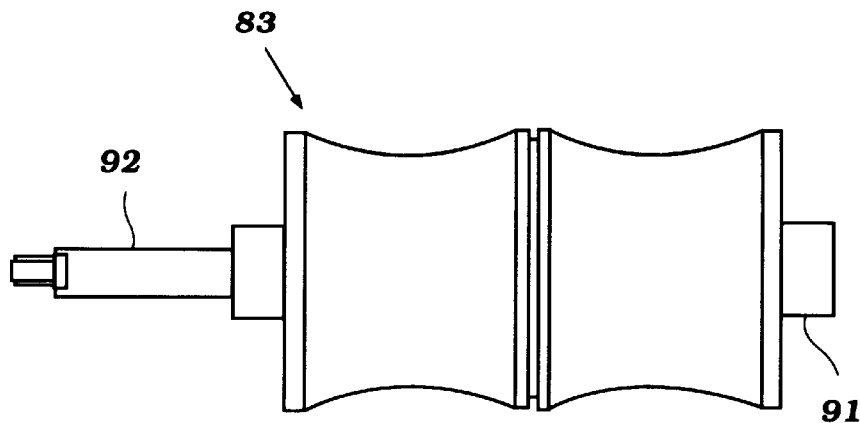
FIG. 4 is a top plan view of the exhaust control valve for the exhaust system.
Figure 5:
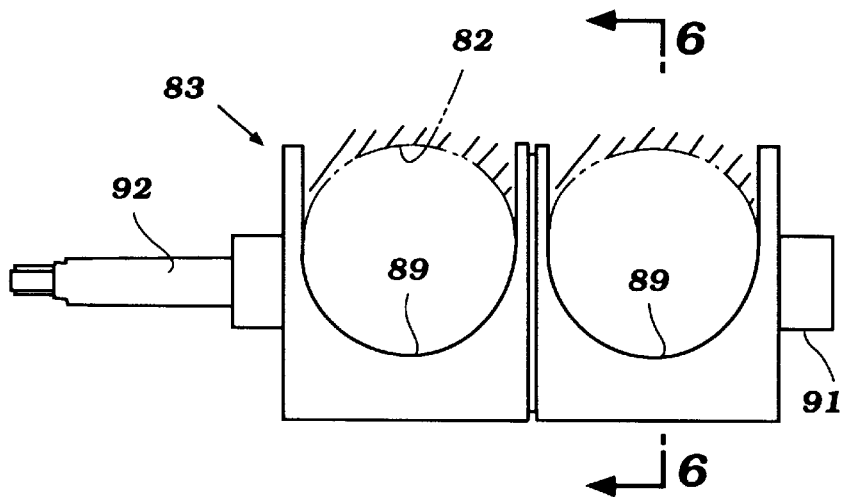
FIG. 5 is a view of the exhaust control valve, looking in a direction perpendicular to the direction of FIG. 4.
Figure 6:
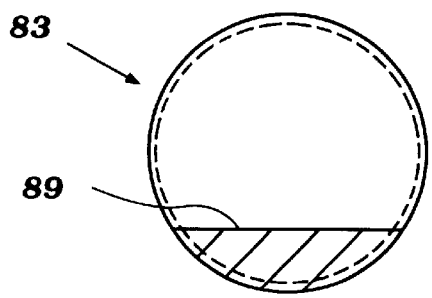
FIG. 6 is a cross-sectional view, taken along the line 6—6 of FIG. 5.

These exhaust manifolds 80 have collector sections that communicate with their respective runners and terminate in discharge openings 81 that are formed in the exhaust guide 37. Exhaust passages 82 are formed in the exhaust guide 37 in registry with the exhaust manifold outlets 81. In accordance with a feature of the invention, an exhaust control valve assembly, indicated generally by the reference numeral 83 and shown in more detail in FIGS. 4–6 is provided within the exhaust guide 37 for a purpose which will be described.

The exhaust guide 37 is formed with a water jacketing arrangement 84 that receives cooling water from the engine cooling system in a known manner. This cooling arrangement permits the exhaust valve 83 to be cooled and assures its good operation. Coolant is delivered to and from the cooling jacket 84 in any suitable manner.

Affixed to the underside of the exhaust guide 37 in any suitable manner are a pair of exhaust pipes 85 and 86, each of which communicates with a respective one of the passages 82 and, accordingly, the exhaust manifolds 80 associated with the respective cylinder banks.

These exhaust pipes 85 and 86 depend into the drive shaft housing 39 and specifically into a silencing expansion chamber 87 formed by an inner shell 88 that is carried by the drive shaft housing 39 in a suitable manner. This inner shell 88 extends downwardly and communicates with a typical underwater exhaust gas discharge for the underwater exhaust discharging and silencing of the exhaust gases flowing from the engine. These types of exhaust systems are well known and also incorporate above the water low-speed speed exhaust gas discharges, for reasons well known in this art. Since this part of the structure forms no portion of the invention, a further description of it is not believed to be necessary to permit those skilled in the art to practice the invention.

The exhaust control valve 83 will now be described by primary reference to FIGS. 3–6 although it also appears in FIG. 2. This exhaust control valve 83 includes a somewhat barrel-shaped element having a pair of hourglass-shaped sections that are cut away as at 89 so as to provide an unrestricted flow area through the passages 82 when the valve 83 is in its fully opened position as seen in FIG. 3 and as also seen in the position of FIG. 5.

This valve element has a first, inner bearing member 91 that is journaled within a corresponding opening formed in the exhaust guide 83. The opposite side of the valve element 85 has a control shaft portion 92 that extends outwardly beyond one side of the valve guide 37. A control pulley 93 is affixed thereto for operating the valve element 83 from its fully opened position to a closed flow-restricting position wherein the effective cross-sectional area of the passages 82 is reduced so as to reduce the amount of capable exhaust flow to the exhaust pipes 85 and 86. The strategy and purpose for this will be described shortly.

Before describing the actual control routine, the various components of the engine and their relationship to the associated sensors and control will be described by reference to FIG. 7. As has been previously noted, this control includes an ECU and this is depicted schematically in FIG. 7 and identified by the reference numeral 95. The ECU 95 receives various input signals from sensors associated with the engine. In some instances, a single sensor may provide data which is utilized to determine more than one engine or other condition.

For example, the engine may include a crank angle sensor, indicated by the reference numeral 96 and bearing the legend CA that senses the actual angular position of the engine crankshaft. This same sensor may, by counting pulses in given time periods, be utilized by provide an engine speed signal as indicated by the block 97 (RPM). Alternatively, there may be a pulser for providing an signal for engine speed at a separate crank angle sensor.

As has been noted, the engine 34 is provided with a fly-by-wire system. Thus, there is provided somewhere in the watercraft, such as in the hull 32, an engine operator accelerator control which merely comprises a position sensing device such as a potentiometer, indicated at 98 which gives an indication of the operator demand indicated at ACC.

For cold starting and warm up, as well as for other engine controls, there is provided a water temperature or engine temperature sensor, indicated schematically by the block 99. This may be provided by a sensor that goes into the cooling jacket of the engine. This sensed value is indicated by the legend TW.

As is typical with some control systems for two-cycle engines, there is also provided a crankcase chamber pressure sensor which senses the pressure in the crankcase chamber 58. This sensor is indicated by the block 101 and this signal may be utilized to provide an indication of actual air flow to the engine, as is known in the art.

There is further provided a sensor that senses exhaust back pressure and this sensor is indicated both schematically by the block 102 in FIG. 7 and is illustrated in actuality in FIG. 3. This back pressure sensor senses exhaust pressure PE and protrudes through the drive shaft housing 39 into the inner shell 88 to communicate with the expansion chamber 87.

In addition to the described operator condition sensors, other types of data can be utilized for engine control. However, one of the features of this invention is that it permits the use of a relatively simplified control wherein either operator demand ACC or load and/or engine speed RPM are utilized as the sense variables to provide the main control for the engine under all but certain specific types of running conditions other than normal state running conditions.

Furthermore, certain ambient conditions may be sensed for engine control and two of these sensors are shown at 103 and 104 in block diagram in FIG. 7. These include an ambient air pressure sensor and an ambient air temperature sensor.

Also associated with the ECU is a memory that includes an arrangement for maintaining and memorizing certain data such as a reference value map and a correction value map, the actual values of which are represented in certain of the figures, as will also be described hereinafter. This memory unit is indicated by the block 105.

The ECU 95 utilizes the accumulated and collected data, in a manner which will also be described, and outputs signals for controlling the actual throttle valve 66. The controlled elements illustrated are respectively the throttle valve 66, the fuel injector 75, the spark plugs 76 and the exhaust control valve 83.

The throttle valve 66 is controlled by a throttle actuator 106 which may comprise a stepper motor or servomotor that operates the throttle shaft of the throttle valve 66.

As has been previously noted, the fuel injectors 75 are operated by solenoid control valves and these solenoid valves are indicated schematically by the block 107. The spark plugs 76 are fired by an ignition circuit, represented by the block 108 and which may comprise, for example, a CDI ignition system that is charged and triggered by means that include a magneto generator (not shown) driven off the crankshaft 38. Finally, the exhaust control valve 83 is operated by a servomotor, indicated schematically at 109 which is coupled to the pulley 93 by a wire actuator.

As has been noted, the basic control for the engine is based upon either engine speed RPM or operator demand ACC. Preferably, the control parameters such as the throttle valve opening TH, ignition timing IGN, fuel injection timing INJ, fuel injection rate FD, and exhaust control valve opening EXV are set in relation to these parameters under normal steady state engine running conditions. This is controlled by a three-dimensional map having a configuration as generally shown in FIG. 8.

The expression "normal running conditions at steady state" is employed to differentiate those conditions where the aforenoted parameters are set from the basic input data from other specific conditions where that basic input data is either modified or adjusted in response to certain specific engine running conditions. These specific engine running conditions, in accordance with the embodiments disclosed, constitute starting (i.e., initial starting of the engine from an off condition), warm up, rapid acceleration, and/or rapid deceleration. Rapid acceleration and rapid deceleration are termed generically as rapid changes in engine speed or rapid demand for engine power changes.

Basically, in the steady state normal operations the position of the throttle valve TH (that of the throttle valves 66) in response to the operator demand ACC is linear above the idle range as shown in FIG. 9 by the solid line curve. If, however, there is a condition of rapid acceleration the actual opening of the throttle valve TH may lag somewhat the actual operator demand as shown by the broken curve in FIG. 9.

Also, when operating at different speed ranges the variation in position between operator demand and throttle valve opening may be varied as shown by the family of curves or maps as shown in FIG. 10. Thus, under steady state normal operations but in the high-speed range, the position of the throttle valve relative to the accelerator or operator demand position will follow the curves shown in FIG. 10. As also noted, the configuration of these curves will be varied in response to the specific engine running conditions aforereferred to.

Figure 11:
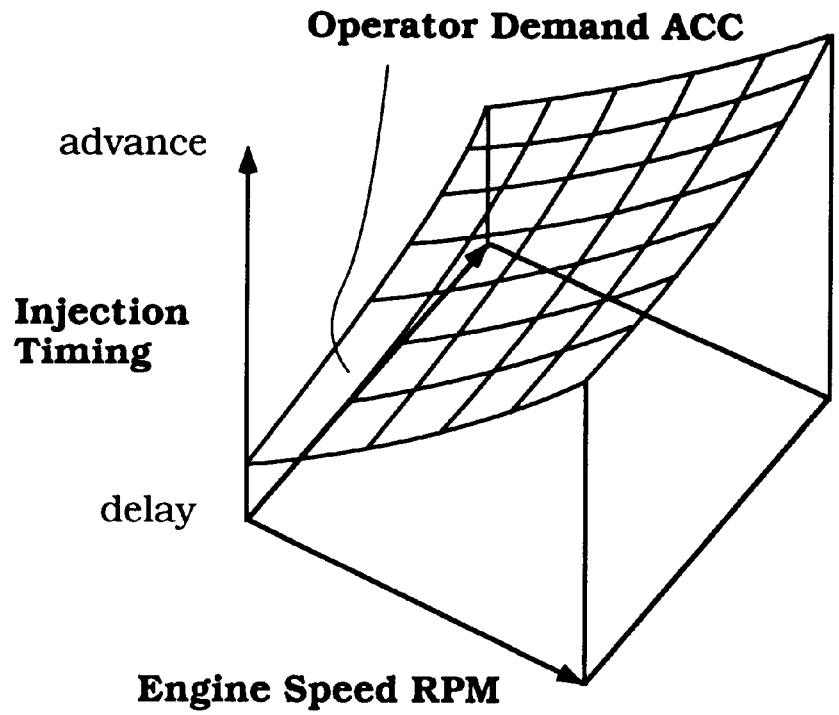
Figure 12:
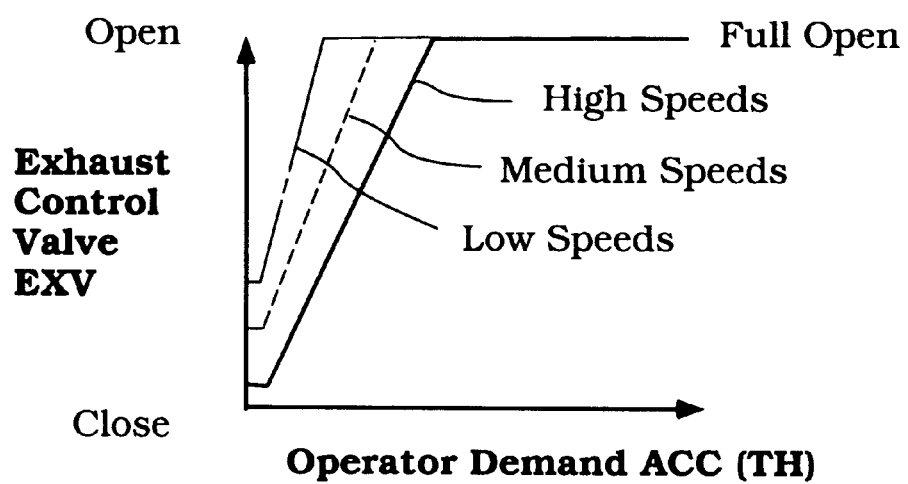

FIGS. 11 and 12 are graphical views showing other generally steady state maps which indicate the control of the injection timing in response to the same parameters as engine speed and operator demand, which is a three-dimensional map or the position of the exhaust control valve which may be a two-dimensional map related to either operator demand ACC or actual throttle position TH. Actually, since these two are related linearly during the normal operating range, a two-dimensional map is all that is required.

As may be seen as the engine speed and/or operator demand increase the timing of beginning of fuel injection is advanced. In a similar manner, the position of the exhaust control valve EXV is generally such that at low loads and demands the exhaust control valve is maintained in its closed position and gradually opened as demand increases until the fully opened position.

By the way, when it is referred to that the exhaust control valve is closed it is to be understood that this is when it is in its full flow restriction position and that the exhaust passage is not completely closed. Like the variation in throttle position relative to operator demand, the slope of these curves and the transition point between fully closed and fully opened varies with speed. The exhaust control valve is opened more rapidly from a more fully opened position under low speeds and the closed position is decreased and the rate of change somewhat increased as the speed ranges increase.

Having thus described the general philosophy of control strategy, which it is to be understood may be of any desired type, the total control will now be described by reference to the remaining figures which show both the control routine and the respective maps that are utilized to either provide full control or compensated control of the exhaust control valve, throttle valve, spark timing, fuel injection timing, and amount, as well as throttle valve position.

Figure 13:
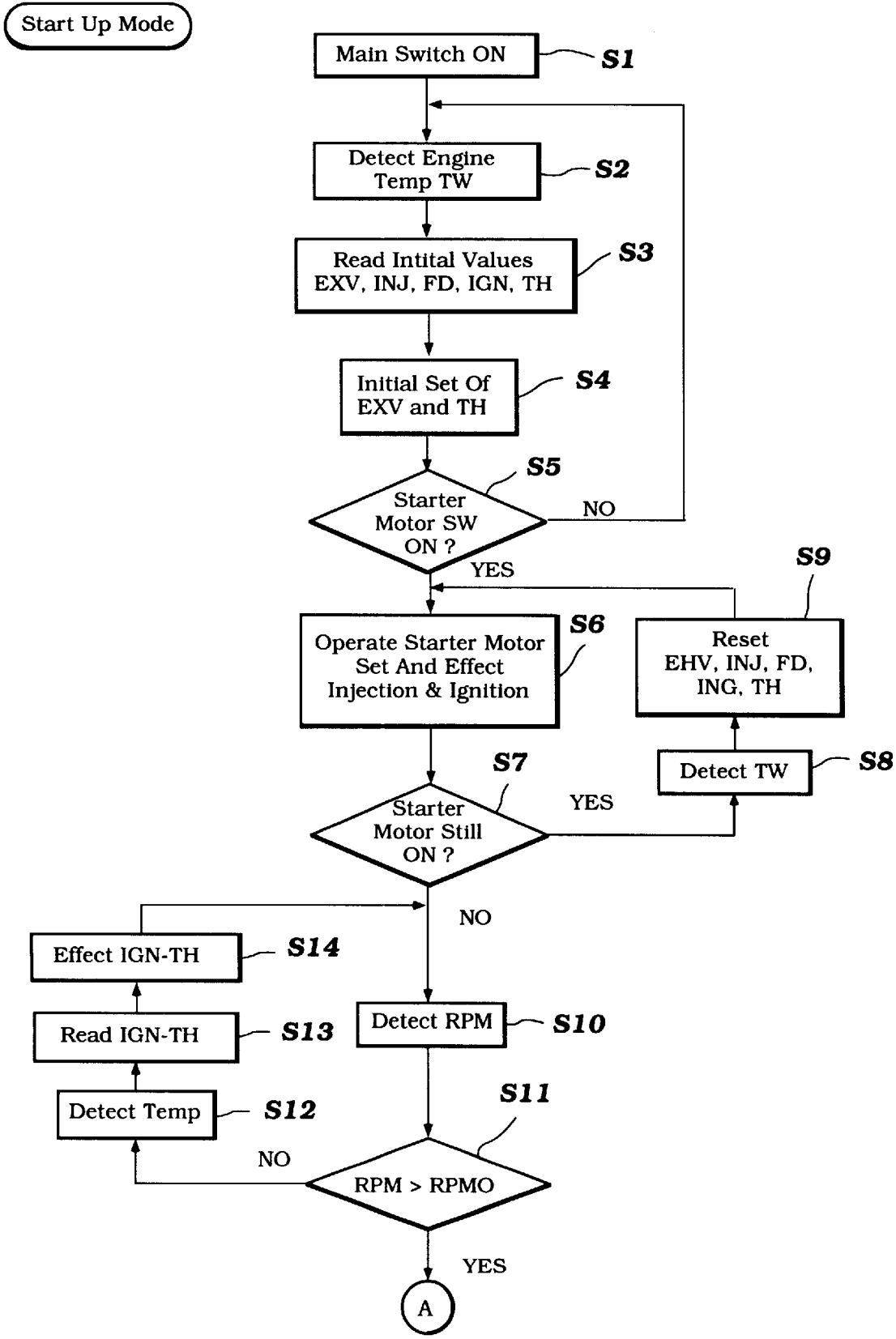
FIG. 13 is a block diagram showing the portion of the control routine during the start-up mode.
Figure 14:
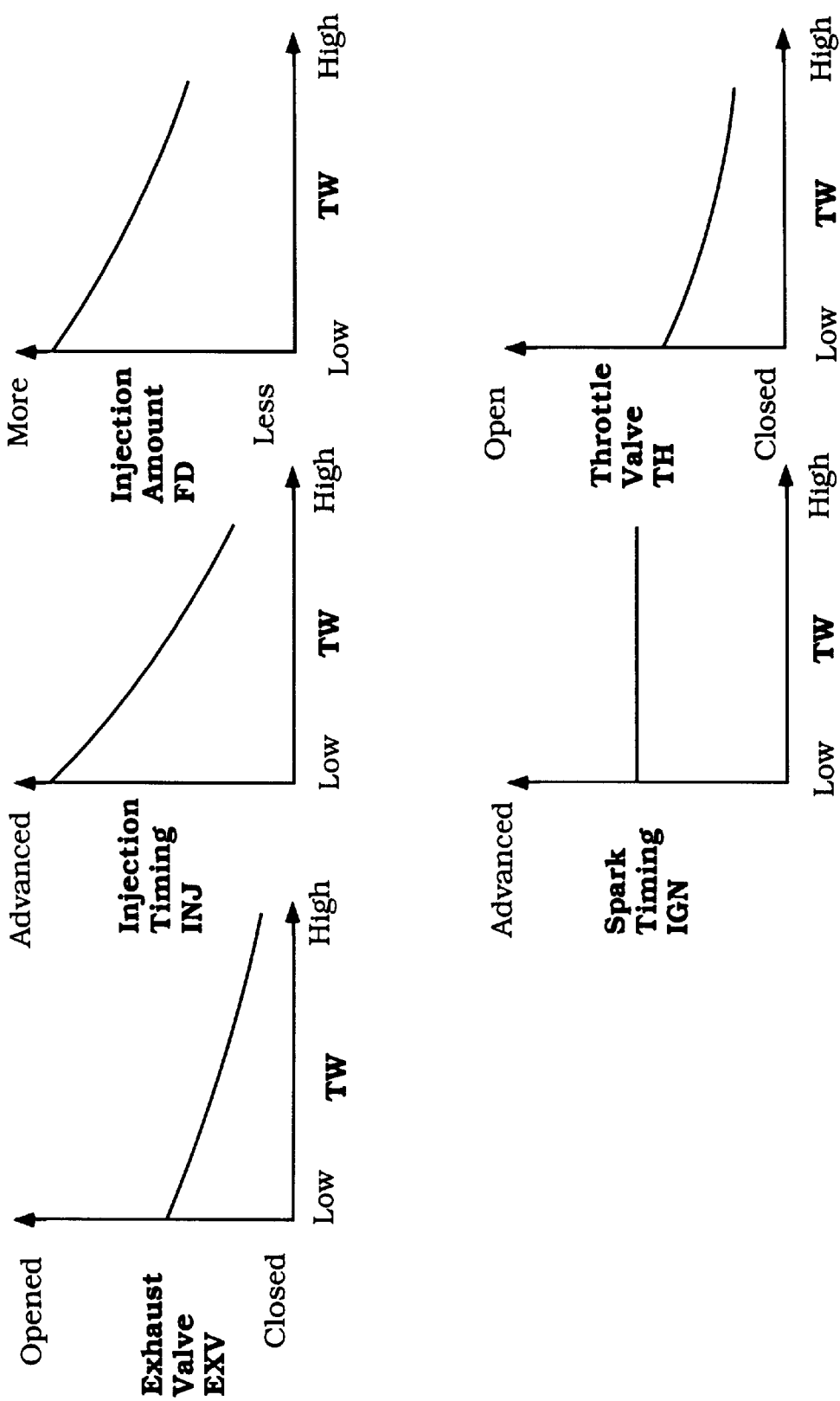
FIG. 14 is a series of graphical views showing the adjustments in response to engine temperature (TW) of the exhaust valve condition (EXV), injection advance timing (INJ), injection amount variation (FD), spark advance timing (INJ), and position of the controlled throttle valve (TH).

FIG. 13 illustrates the startup mode when starting the engine from standstill. The engine 34 is provided with an electric motor starter which is not shown but which cooperates with the crankshaft 38 for cranking the crankshaft. Obviously, since the engine is not running at this time certain engine running characteristics such as engine speed are not available for control. In accordance with the invention, the various control components of the engine and specifically the exhaust control valve, fuel injection initiation and duration, spark advance timing, and positioning of the throttle control valve 66 are determined under this condition purely by the temperature of the engine indicated at TW since the engine temperature is measured by the temperature of the cooling water. The maps for these controls are shown in FIG. 14.

The program is initiated at the step S1 when the main switch is turned on. The program then moves to the step S2 so as to detect the engine temperature measured by the aforenoted temperature sensor 99. The program then moves to the step S3 so as to look up the values for setting of the various components from maps in the memory 105 which maps are depicted schematically in FIG. 14.

As may be seen, when the water temperature is low, the exhaust valve 83 is not closed as much as when the engine is at normal operating condition. Said another way, the exhaust valve is maintained in a more open position so as to facilitate the drawing of a fresh air charge into the engine.

In a similar sense, both the timing of beginning of fuel injection and the amount of fuel injected are advanced and increased, respectively, as the temperature is lowered. Again, this is to provide the enriched fuel/air mixture necessary to ensure good starting and quick warm up.

The spark advance IGN is actually held constant regardless of speed during start up. The throttle valve TH is set by operating the throttle actuator 106 to position the throttle valves 66 so as to cause the throttle valves to be more fully opened as the temperature is lowered. Again, this is to ensure that the engine can receive adequate air for good and quick starting.

The program then moves to the step S4 so as to initially position the exhaust control valve 83 and the throttle valve 66 in the positions determined by reading the maps of FIG. 14 at the step S3.

The program then moves to the step S5 so as to determine if the starter motor switch has been turned on. If it has not, the program repeats.

If, however, the operator has not only switched on the main ignition switch but has also turned on the starter switch the program moves ahead to the step S6. At this step, the starter motor is actuated and the fuel injection is begun at the read timing INJ and in the read amount FD. The ignition of the spark plugs 76 is also initiated at the aforenoted fixed spark advance timing.

The program then moves to the step S8 to determine whether the engine has started or not by determining if the starter motor switch is still on. If the starter motor switch is still on, then the program repeats back through the steps S8 and S9. At the step S8, the engine temperature TW is again sensed. At the step S9, the settings of the various control components is again effected based upon the water temperature sensed at the step S8.

If, however, at the step S7 it is determined that the starter motor is no longer on, then the program operates so as to ensure stable running of the engine by proceeding first to the step S10 to measure the actual engine running speed. The program then moves to the step S11 so as to compare the detected engine running speed RPM with the running speed RPM 0 which is indicative of the minimum speed at which stable running can occur.

If the speed has not reached its value yet, the program moves to the step S12 so as to again detect the temperature of the water. Then at the step S13 the appropriate spark advanced timing for the actual running condition is read. The program then moves to the step S14 to set the ignition timing and throttle control to those called for by the engine temperature and running condition.

Figure 15:
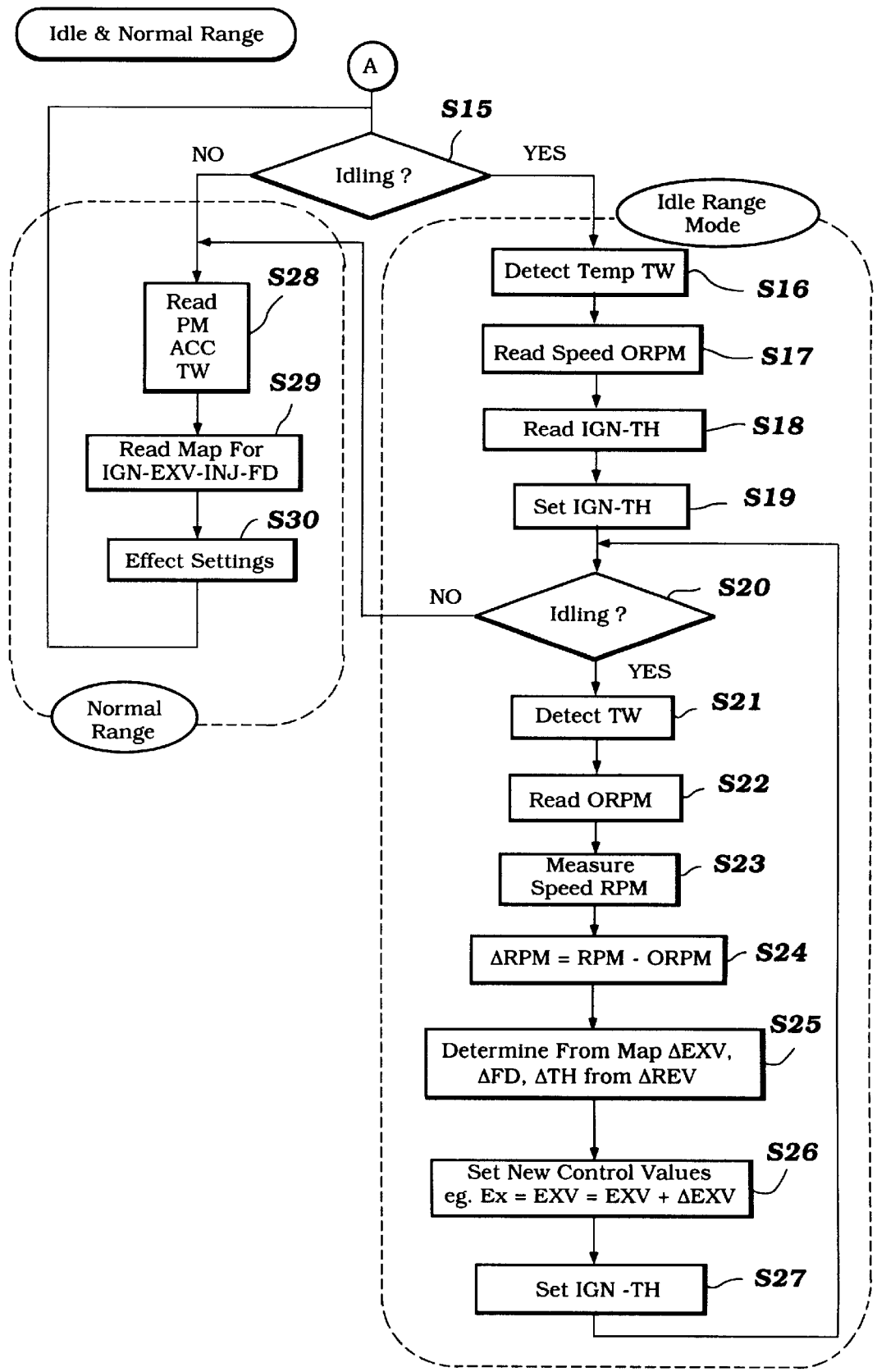
FIG. 15 is a block diagram showing another portion of the control routine when operating in either the idling range or the normal fixed load ranges.

If at the step S11 it is determined that the engine is running at a speed greater than the speed RPM 0 then the program moves ahead to the control routine shown in FIG. 15.

In the portion shown in FIG. 15, the program moves to the first step S15 to determine if the engine is operating in an idle mode. This is determined by determining both the condition of the accelerator or operator demand condition ACC. This is done preferably by using an idle detector switch.

Figure 16:
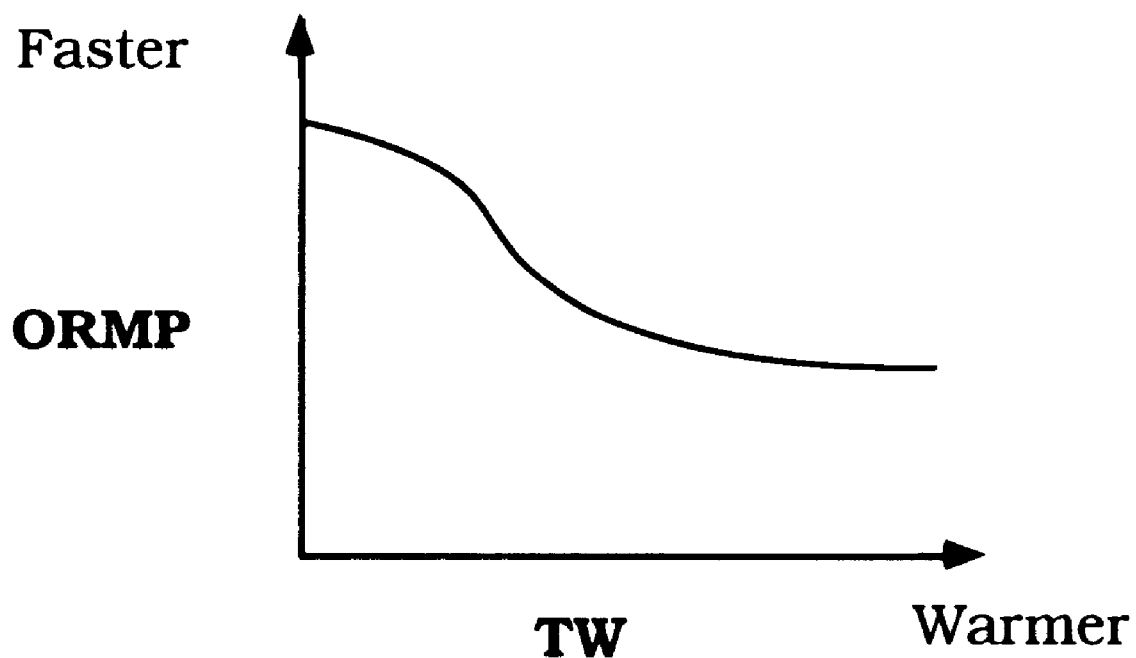
FIG. 16 is a graphical view showing the control of engine speed during idling warm-up conditions.

If, the accelerator control is in its normal idle position and having determined that the engine is running, then it is assumed that the engine is in an idling mode. The program then moves to the idle range mode which is a separate type of control mode for controlling the setting of the various components in response to certain fixed maps, as will be described. The basic philosophy is to attempt to ensure that the engine warms up quickly to its normal operating temperature. Therefore, at the step S16, the engine temperature TW is measured. Having determined the engine running temperature at the step S16, the program then moves to the step S17 so as to determine or read from a map the target idle speed ORPM. This is done by looking up at a map as shown in FIG. 16.

Figure 17:
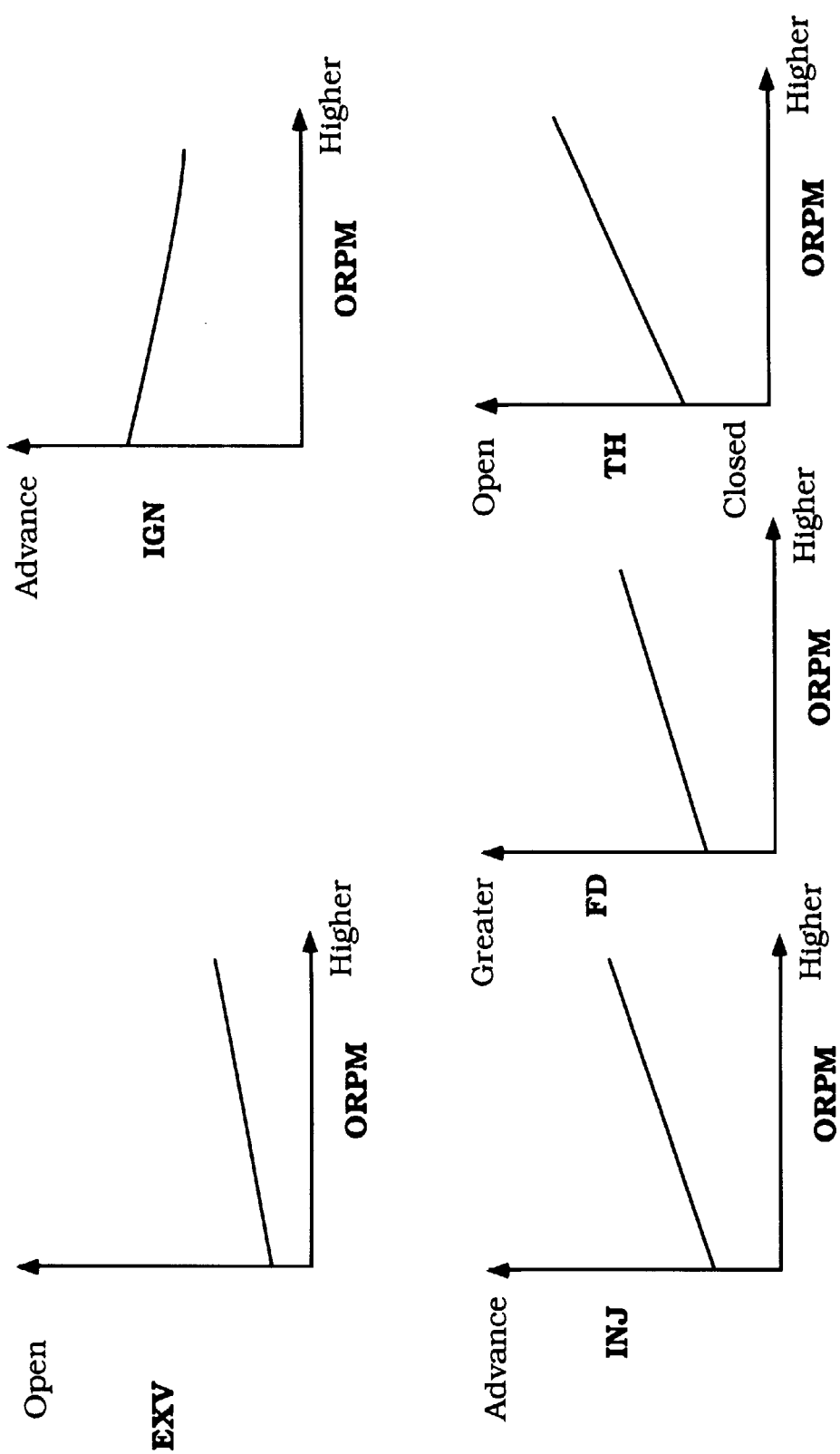
FIG. 17 is a series of maps showing how the exhaust valve timing (EXV), ignition timing (IGN), fuel injection timing (INJ), fuel injection amount (FD), and throttle valve positions (TH) are changed in response to variations in desired engine idle speed ORPM.

As may be seen, the lower the temperature, the higher the target idle RPMO RPM is set. The program then moves to the step S18 to read the various settings for the controls from maps as shown in FIG. 17. These are the settings of the exhaust control valve EXV, spark ignition timing IGN, fuel injection timing INJ, and fuel injection amount FD. In addition, the desired setting of the throttle valve TH is also determined from such a map.

As may be seen, if the target speed is higher than normal speed, the exhaust valve is opened greater than normal, the ignition timing is somewhat retarded and the fuel injection timing and amount are increased. Also, the throttle opening is increased. All of these are done so as to ensure a more rapid warm up.

Having made these readings at the step S18, the program then moves to the step S19 so as to set the values in accordance with those read from the map. The program having thus made the settings then moves to the step S20 to determine if the engine is still operating in the idle mode. Again, this is done by determining if the setting of the accelerator control or operator demand control ACC is in the idle position as determined by an idle switch.

If the engine is still operating in the idle mode, the program then moves to the step S21 so as to detect the engine temperature TW. The program then moves to the step S22 to read the value of the desired idle speed ORPM from the map of FIG. 16 as aforedescribed.

The program then moves to the step S23 so as to measure the actual speed of the engine RPM. The program then moves to the step S24 so as to calculate the variation in actual speed from the desired idle speed ORPM. It is to be understood that at the step S24 the value of $\Delta$RPM may be either a negative or a positive value. That is, if the engine speed is running at a speed greater than the desired idle RPM, ORPM, then the value $\Delta$RPM will be positive. If, however, the actual engine idle speed, RPM, is less than the desired idle speed, ORPM, then the value $\Delta$RPM will be negative.

It should be noted that this calculation will be done in order to make corrective amounts since the preset setting of the control parameters, i.e., exhaust valve opening, ignition timing, injection amount, and injection timing and throttle valve position do not provide the desired idle speed.

Figure 18:
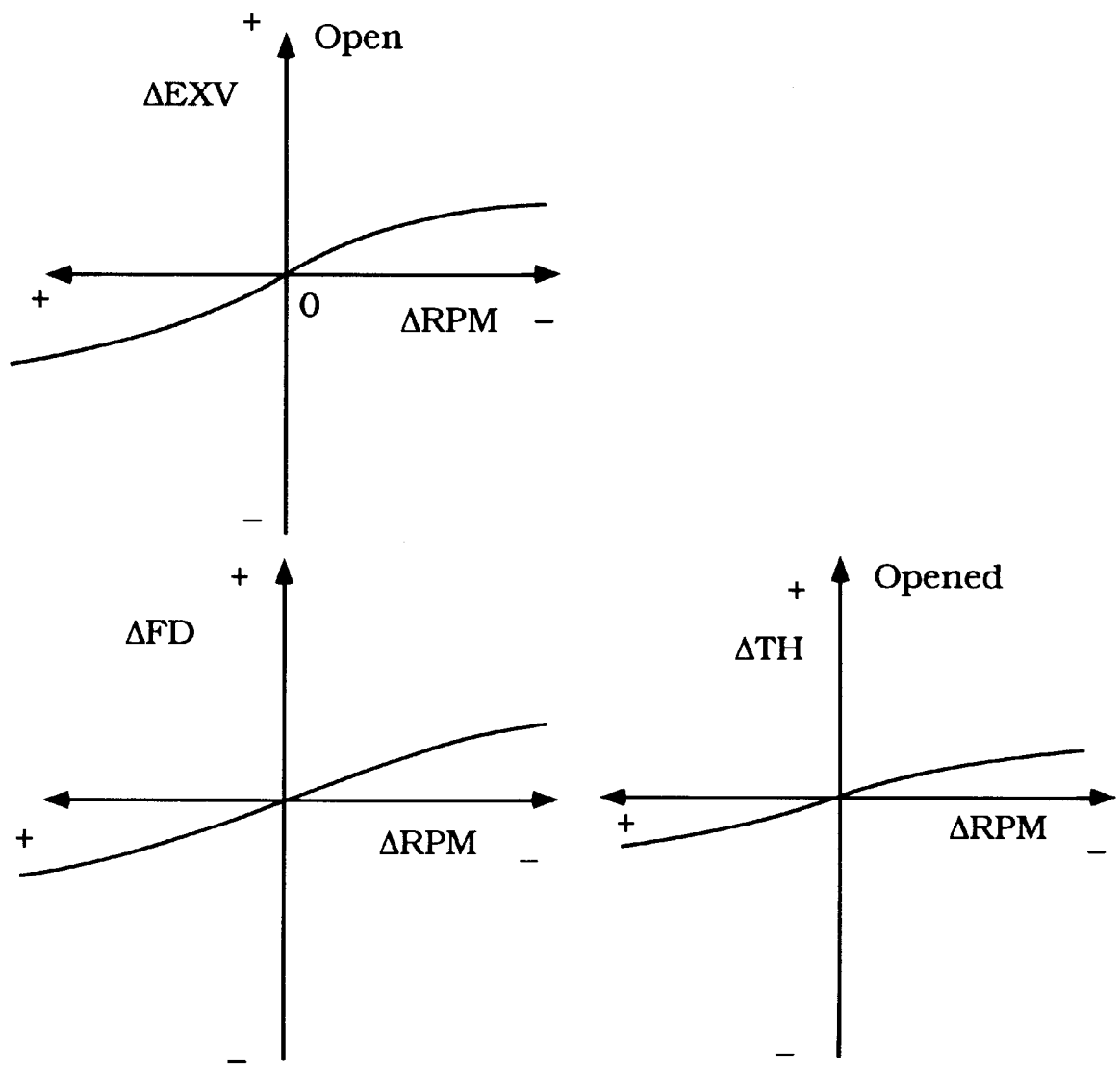
FIG. 18 is a graphical view showing the variations in certain characteristics to maintain the desired warm up idle speed.
Figure 19:
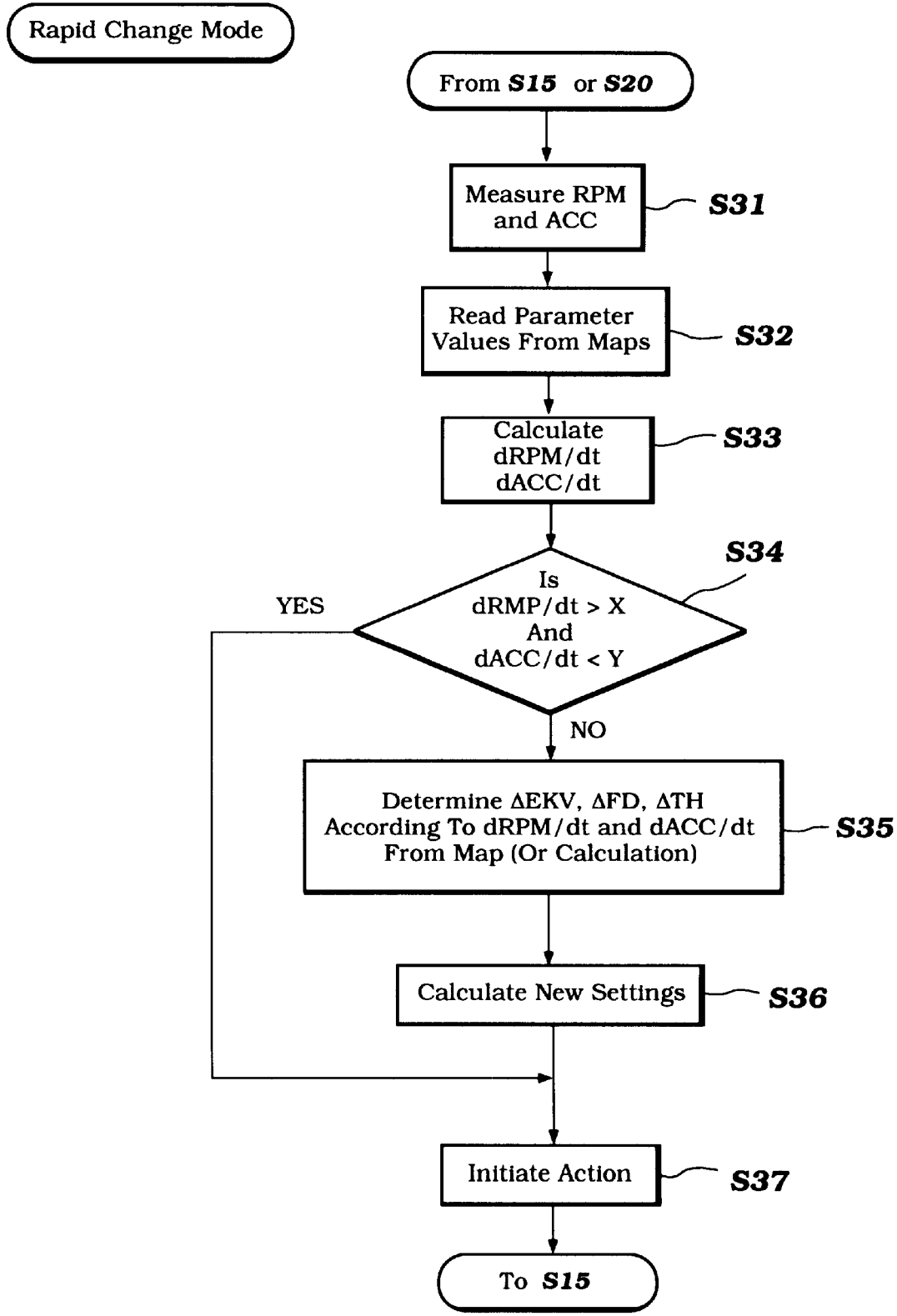
FIG. 19 is a further block diagram showing the portion of the control routine during the rapid acceleration or deceleration modes.

The program then moves to the step S25 to read from a map, such as the map of FIG. 18 the corrective amounts necessary in order to bring the idle speed to the desired idle speed.

In the illustrated embodiment, the fuel injection timing is not adjusted but the fuel injection amount is adjusted. Thus, the initiation of fuel injection is maintained constant but the duration is changed by changing the termination timing. Thus, if the idle speed is below the desired idle speed and the value of ΔRPM is thus negative, both the exhaust valve opening amount is increased, the fuel injection amount is increased, and the throttle valve settings are opened. If, on the other hand, the idle speed is greater than the desired speed, the adjustments are made in the opposite sense.

Thus, after the step S25 has been completed, new control values are set by making the corrections from FIG. 18 to the values which were determined from FIG. 17. At the step S27, the settings to these new values are then initiated and the program repeats back to the step S20.

Thus, it should be readily apparent that during the warm up idling mode, which is again a different mode, there are compensations made from the settings of the exhaust control valve, fuel injection timing and amount, spark timing and throttle valve setting from those under the steady state normal running conditions.

If at either the steps S15 or S20 it is determined that the engine is operating outside of the idle mode then the program moves to the step S28. This is the beginning of the normal operational control mode when the settings are made from reading the maps previously referred to and shown in FIGS. 8–10. However, this routine is only followed if it is not detected that the engine is being operated in a rapid acceleration or a rapid deceleration mode, as will be described later by reference to FIGS. 19–22.

Continuing to refer to the normal operational mode beginning at the step S28 of FIG. 15, there is a detection made of the engine speed, operator demand, and water temperature. The program then utilizing this data moves to the step S29 so as to read from the appropriate parameter maps, as seen in FIG. 8 the necessary setting for the fuel injection timing and duration, exhaust valve setting, and ignition timing. In addition, maps as in FIGS. 9 and 10 are consulted so as to determine the appropriate setting for the throttle valve in response to the accelerator condition ACC and the program then moves to the step S30 to effect these settings. The program then repeats back to the step S15.

The remaining non-normal mode that is controlled in accordance with this invention will now be described with reference to FIGS. 19–22, this being the rapid change mode. This may be either rapid acceleration or rapid deceleration.

When the program determines in the steps S20 or S15 in FIG. 15 that the engine is not in the idle mode it moves to the step S28 as previously noted. At the same time, however, the program also runs through the control routine of FIG. 19 so as to determine if there is a rapid change in operator demand.

This is accomplished by moving first to the step S31 so as to measure both the engine speed, RPM, and the position of the accelerator or operator demand, ACC. The program then moves to the step S32 which again reads the map settings and, if operating in the normal mode, effects them as set forth in the steps S29 and S30 of FIG. 15.

With this portion of the program, however, at the step S32, the program also makes a calculation in both the rate of change of engine speed and the rate of change of accelerator position at the step S33. This is done by comparing the instantaneous readings with the previous readings for a given time period.

Having made these calculations, the program then moves to the step S34 to see if the change in engine speed is greater than a value indicated at X and the change in accelerator position in time is less than a predetermined value Y.

If the speed is not changing greater than the amount X in the time or the accelerator position is less than the value Y in the time period, then the system is deemed to be operating in its normal condition and the program moves ahead to the step normal actuation as indicated at the step S28 of FIG. 15. The program then repeats back to the step S15.

If, however, the engine speed change is less than the value X or the change in throttle position is greater than the value Y, then it is determined that there is a rapid change condition being effected. The program then moves to the step S45 so as to determine values of ΔEXV, ΔFD, and ΔTH according to the appropriate maps or by calculation.

Figure 20:
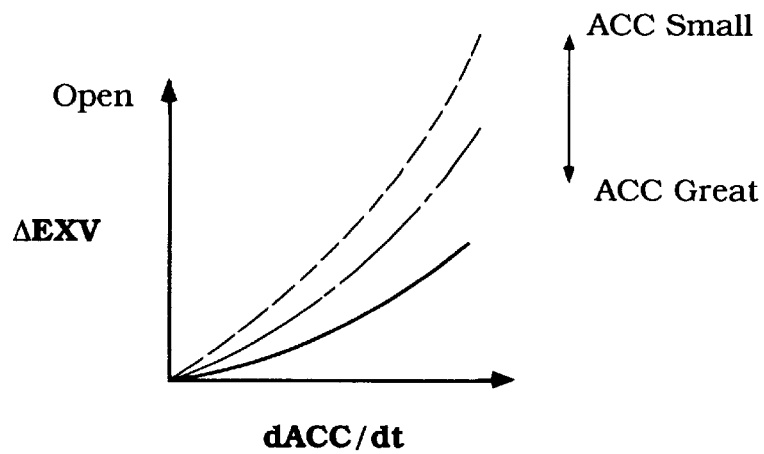
FIG. 20 is a graphical view showing the maps of the correction of the exhaust valve control in response to changes in operator demanded acceleration.
Figure 21:
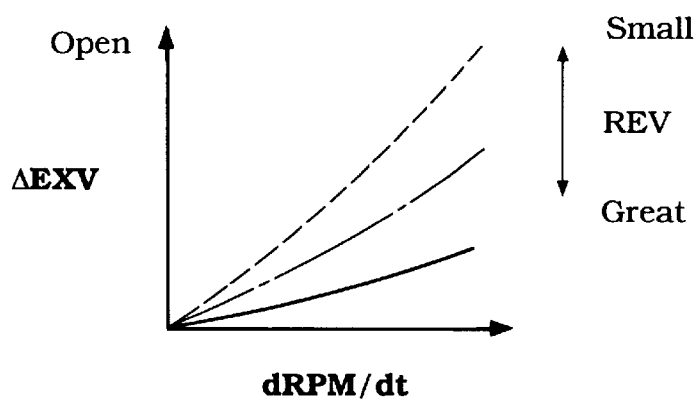
FIG. 21 is a graphical view showing the maps of the correction of the exhaust valve control in response to changes in engine speed.

As seen in FIG. 20, as the accelerator opening speed is increased rapidly, the exhaust valve is opened more rapidly so as to permit the scavenge flow to be increased. Also, as seen in FIG. 21, as the engine speed increases more rapidly, the exhaust valve also is open more rapidly for the same reasons.

Figure 22:
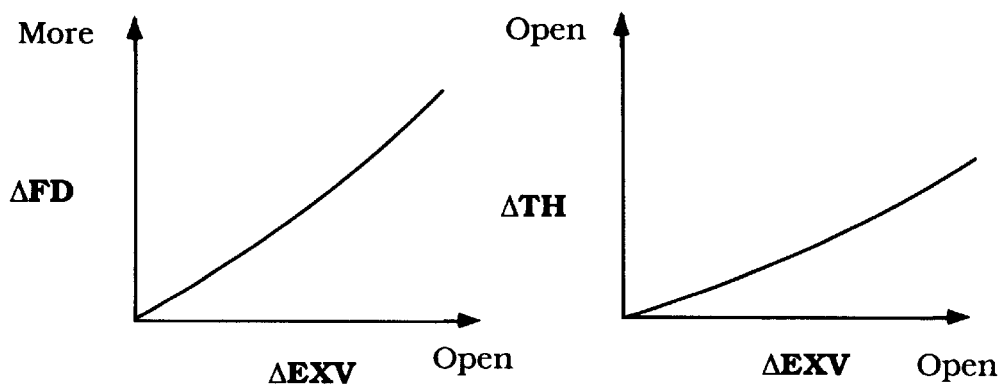
FIG. 22 is a pair of graphical views showing how the change in fuel injection amount and throttle valve position are controlled in response to the change in the position of the exhaust control valve during transient conditions.

When the rate of exhaust valve opening is determined, then the fuel injection amounts and throttle valve position settings are adjusted in accordance with the maps of FIG. 22 so as to further improve the performance during this transitional phase.

Thus, it should be readily apparent that the described control arrangement provides for good engine performance under not only steady state conditions but can compensate for other than normal steady state conditions such as starting, warm up, rapid acceleration or deceleration. Furthermore, the idle warm up speed can be set and stabilized utilizing the controls that include the exhaust control valve.

Of course, the foregoing description is that of preferred embodiments of the invention. It will be readily apparent to those skilled in the art how various changes and modifications may be made without departing from the spirit and scope of the invention, as defined by the appended claims.

What is claimed is:

1. A two-cycle, crankcase compression, internal combustion engine comprised of a cylinder block defining a cylinder bore, a cylinder head fixed at one end of said cylinder block enclosing one end of said cylinder bore, a crankcase member fixed at the other end of said cylinder block and closing the other end of said cylinder bore and forming a crankcase chamber therewith, a piston reciprocating in said cylinder bore, a crankshaft rotatably journaled in said crankcase chamber and driven by said piston, said piston, said cylinder bore, and said cylinder head forming a combustion chamber, at least one scavenge port formed in a wall of said cylinder bore for transferring an air charge compressed in said crankcase chamber to said combustion chamber, reciprocating motion of said piston opening and closing said scavenge port, an exhaust port in said cylinder bore opened and closed by the reciprocation of said piston and for discharging exhaust gases from said combustion chamber, a fuel injector for injecting fuel directly into said combustion chamber, an exhaust system for discharging exhaust gases from said exhaust port to the atmosphere, an exhaust control valve for controlling the effective cross-sectional area of said exhaust system, a starter for starting said engine, means for sensing at least one running condition of said engine, control means for operating said exhaust control valve for controlling the effective cross-sectional area of said exhaust system in response to said one sensed engine running condition, means for sensing the starting of said engine by said starter, and means for modifying the effective position of said exhaust control valve in the event of the sensing of said starting of said engine.

2. A two-cycle, crankcase compression, internal combustion engine as set forth in claim 1, wherein the one sensed engine running condition is engine speed.

3. A two-cycle, crankcase compression, internal combustion engine as set forth in claim 1, wherein the one sensed engine running condition is operator demand.

4. A two-cycle, crankcase compression, internal combustion engine as set forth in claim 3, wherein operator demand is determined by the position of an accelerator control operated by the operator.

5. A two-cycle, crankcase compression, internal combustion engine as set forth in claim 4, wherein engine speed is also sensed and the exhaust control valve is positioned under the normal steady state engine operating condition in response to a three-dimensional map based upon the sensed operator demand and engine speed.

6. A two-cycle, crankcase compression, internal combustion engine as set forth in claim 1, wherein the exhaust control valve is positioned in a more fully opened position during engine starting than when the engine is running in the normal steady state condition.

7. A two-cycle, crankcase compression, internal combustion engine as set forth in claim 6, wherein the degree of opening of the exhaust control valve is varied depending upon the engine temperature during starting.

8. A two-cycle, crankcase compression, internal combustion engine as set forth in claim 1, wherein there is further provided a throttle valve for controlling the flow of air to the engine for combustion and an operator accelerator control for operation by an operator for controlling the engine speed and further including servo means interposed between the operator accelerator control and the throttle valve for controlling the opening of said throttle valve.

9. A method of operating a two-cycle, crankcase compression, internal combustion engine comprised of a cylinder block defining a cylinder bore, a cylinder head fixed at one end of said cylinder block enclosing one end of said cylinder bore, a crankcase member fixed at the other end of said cylinder block and closing the other end of said cylinder bore and forming a crankcase chamber therewith, a piston reciprocating in said cylinder bore, a crankshaft rotatably journaled in said crankcase chamber and driven by said piston, said piston, said cylinder bore, and said cylinder head forming a combustion chamber, at least one scavenge port formed in a wall of said cylinder bore for transferring an air charge compressed in said crankcase chamber to said combustion chamber, reciprocating motion of said piston opening and closing said scavenge port, an exhaust port in said cylinder bore opened and closed by the reciprocation of said piston and for discharging exhaust gases from said combustion chamber, a fuel injector for injecting fuel directly into said combustion chamber, an exhaust system for discharging exhaust gases from said exhaust port to the atmosphere, an exhaust control valve for controlling the effective cross-sectional area of said exhaust system, and a starter for starting said engine, said method comprising the steps of sensing at least one running condition of said engine, operating said exhaust control valve for controlling the effective cross-sectional area of said exhaust system in response to said one sensed engine running condition, sensing starting of said engine by said starter, and modifying the effective position of said exhaust control valve in the event of the sensing of starting of said engine.

10. A method of operating a two-cycle, crankcase compression, internal combustion engine as set forth in claim 9, wherein the one sensed engine running condition is engine speed.

11. A method of operating a two-cycle, crankcase compression, internal combustion engine as set forth in claim 9, wherein the one sensed engine running condition is operator demand.

12. A method of operating a two-cycle, crankcase compression, internal combustion engine as set forth in claim 11, wherein operator demand is determined by the position of an accelerator control operated by the operator.

13. A method of operating a two-cycle, crankcase compression, internal combustion engine as set forth in claim 12, wherein engine speed is also sensed and the exhaust control valve is positioned under the normal steady state engine operating condition in response to a three-dimensional map based upon the sensed operator demand and engine speed.

14. A method of operating a two-cycle, crankcase compression, internal combustion engine as set forth in claim 9, wherein the exhaust control valve is positioned in a more fully opened position during engine starting than when the engine is running in the normal steady state condition.

15. A method of operating a two-cycle, crankcase compression, internal combustion engine as set forth in claim 14, wherein the degree of opening of the exhaust control valve is varied depending upon the engine temperature during starting.

16. A method of operating a two-cycle, crankcase compression, internal combustion engine as set forth in claim 9, wherein there is further provided a throttle valve for controlling the flow of air to the engine for combustion and an operator accelerator control for operation by an operator for controlling the engine speed and further including for controlling the opening of said throttle valve in response to the operator demand.

* * * * *